US006395842B1

(12) United States Patent
Main

(10) Patent No.: US 6,395,842 B1
(45) Date of Patent: May 28, 2002

(54) POLYMER SUPPORTS CONTAINING POLYOXYALKYLENES

(75) Inventor: Brian Geoffrey Main, Macclesfield (GB)

(73) Assignee: Avecia Limited, Blackley (GB)

(*) Notice: Subject to any disclaimer, the term of this patent is extended or adjusted under 35 U.S.C. 154(b) by 0 days.

(21) Appl. No.: 09/743,455

(22) PCT Filed: Jul. 8, 1999

(86) PCT No.: PCT/GB99/02193

§ 371 (c)(1),
(2), (4) Date: Jan. 10, 2001

(87) PCT Pub. No.: WO00/02953

PCT Pub. Date: Jan. 20, 2000

(30) Foreign Application Priority Data

Jul. 10, 1998 (GB) .............................................. 9814876

(51) Int. Cl.$^7$ ................................................. C08F 8/00
(52) U.S. Cl. ....................... 525/384; 525/385; 526/320; 526/329.6
(58) Field of Search ................................ 525/384, 385; 526/320, 329.6

(56) References Cited

U.S. PATENT DOCUMENTS 4,908,405 A * 3/1990 Bayer et al. ................... 525/61
5,466,758 A * 11/1995 Yoon-Sik et al. ........... 525/384

FOREIGN PATENT DOCUMENTS

WO       WO 97/27266       *   7/1997

OTHER PUBLICATIONS

Harris J.M. "Laboratory synthesis of polyethylene glycol derivatives". Jurnal of Macromolecular Science–Reviews in Macromolecular Chemistry, vol. C–25, No. 3, Jan. 1, 1985, pp. 325–373.*

Hiratani, Kazuhisa et al., "Preparation and Catalytic Behaviour of Polymers with Pendant Oligoethyleneoxy–groups (Polymers of Non–cyclic Crown Ethers)" *Israel Journal of Chemistry* (1979) 18:208–213.

* cited by examiner

*Primary Examiner*—James J. Seidleck
*Assistant Examiner*—Olga Asinovsky
(74) *Attorney, Agent, or Firm*—Pillsbury Winthrop LLP

(57) ABSTRACT

A polymer support is provided which comprises hydroxypoly$C_{2-4}$ alkyleneoxy chains attached to a cross-linked polymer. The hydroxypoly$C_{2-4}$ alkyleneoxy chain contains from 2 to 8 $C_{2-4}$ alkyleneoxy groups and the polymer support has from about 0.1 to about 5 meq free hydroxy groups per gram of polymer. Preferably, the cross linked polymer is a copolymer comprising phenylethylene and 4-hydroxyphenylethylene units or phenylethylene and 4-chloromethylphenylethylene units.

16 Claims, No Drawings

POLYMER SUPPORTS CONTAINING POLYOXYALKYLENES

The present invention relates to polymers which are useful as supports in solid phase organic synthesis (SPOS). Cross-linked insoluble polystyrene resin supports, normally in the form of spherical beads, are one of the most important types of substrate used for SPOS. They are relatively cheap and robust, can be made with a high functional group loading, with a wide range of functionalities available, and they swell in a variety of non hydroxylic solvents, thus giving access to a variety of reagents. Their main drawbacks are the lack of swelling in water or alcohols, and the close proximity of the functional groups to the hydrophobic core, which can cause steric hindrance to reactions, slowing or even preventing them, and may also give rise to poor NMR spectra due to slow relaxation times.

'Tentagel'™ (trademark of Rapp Polymere GMBH) polymer supports are used widely in SPOS. These polymer supports have a polystyrene core with polyethylene glycol (MWt ca 4000) chains grafted onto this core. The terminal hydroxy groups are then functionalised to allow the synthesis to take place. The polymer supports are useful in that they are hydrophilic and so can swell in polar solvents such as water and alcohols as well as the usual solvents (toluene, tetrahydrofuran, dichloromethane) used for SPOS. The functional groups are well separated from the crosslinked polystyrene core and are thus unhindered for reaction and very mobile for good NMR analysis. The main deficiencies are that the functional group loading is low and they possess an acid labile benzyl ether linkage, thus restricting the range of reaction conditions under which they can be employed.

We have designed and made a series of novel polymer resin supports that can have a higher functional loading than that of 'Tentagel'™ and yet, in certain embodiments, still swell in water or alcohols and at the same time do not have unduly slow relaxation times enabling NMR to be used.

Accordingly the present invention provides a polymer support which comprises hydroxypoly$C_{2-4}$ alkyleneoxy chains attached to a cross-linked polymer wherein the hydroxypoly$C_{2-4}$ alkyleneoxy chain contains from 2 to 8 $C_{2-4}$ alkyleneoxy groups and wherein the resulting polymer support has from about 0.1 to about 5 meq free hydroxy groups per gram of polymer.

The hydroxypoly$C_{2-4}$alkyleneoxy chains in the supports according to the present invention are often selected from hydroxypolyethyleneoxy (HO(CH$_2$CH$_2$O)$_{2-8}$—), hydroxypolypropyleneoxy (HO(CH$_2$CH(CH$_3$)O)$_{2-8}$—) and hydroxypolybutyleneoxy (HO(CH$_2$CH(C$_2$H$_5$)O)$_{2-8}$—) chains. In a preferred embodiment of the invention the hydroxypoly$C_{2-4}$alkyleneoxy chain is hydroxypolyethyleneoxy.

The number of $C_{2-4}$alkyleneoxy groups in the hydroxypoly$C_{2-4}$alkyleneoxy chain can range from 2 to 8, but is preferably from 3 to 5. Most preferably, there are 4 $C_{2-4}$alkyleneoxy groups in the hydroxypoly$C_{2-4}$alkyleneoxy chain.

In the most preferred embodiment of the invention the hydroxypoly$C_{2-4}$alkyleneoxy chain is hydroxytetraethyleneoxy (HO(CH$_2$CH$_2$O)$_4$—).

The cross-linked polymer in the supports according to the present invention may be, for example, a cross-linked polymer obtainable by polymerising a monomer mixture comprising at least one monomer selected from hydroxystyrene, hydroxymethylstyrene, chloromethylstyrene, hydroxyethyl (meth)acrylate, hydroxypropyl (meth)acrylate and N-methylol (meth)acrylamide; wherein the phenyl ring in the styrenes is optionally substituted by 1 or 2 substituents often selected from methyl, ethyl, propyl, fluoro, chloro and bromo and wherein hydroxy groups, especially phenolic hydroxy groups, which may be present in the monomers are optionally protected and may subsequently be deprotected.

Preferably the cross-linked polymer is a copolymer comprising phenylethylene and hydroxyphenylethylene units or phenylethylene and chloromethylphenylethylene units, and more preferably a copolymer comprising phenylethylene and 4-hydroxyphenylethylene units or phenylethylene and 4-chloromethylphenylethylene units. The polymer support formed from a cross-linked polymer comprising phenylethylene and 4-hydroxyphenylethylene units has the additional advantage of not containing an acid labile benzyl ether linkage. Even more preferably the cross-linked polymer is a copolymer comprising phenylethylene and 4-hydroxyphenylethylene units. The cross-linked polymer can often be derived by polymerising a monomer mixture comprising styrene and optionally protected hydroxystyrene and subsequently deprotecting the hydroxy group if protected, or a monomer mixture comprising styrene and chloromethylstyrene. Most preferably the cross-linked copolymer is obtainable by polymerising styrene and optionally protected 4-hydroxystyrene under conditions to produce cross-linking, and subsequently deprotecting the hydroxy group if protected.

Protecting groups for hydroxy groups may in general be chosen from any of the groups described in the literature or known to the skilled chemist as appropriate for the protection of the hydroxy group in question, and may be introduced by conventional methods. Where protecting groups are present during a polymerisation process, the protecting groups are selected so as to survive the conditions of the polymerisation.

Protecting groups may be removed by any convenient method as described in the literature or known to the skilled chemist as appropriate for the removal of the protecting group with minimum disturbance of groups elsewhere in the molecule.

Specific examples of protecting groups are given below for the sake of convenience, in which "lower" signifies that the group to which it is applied preferably has 1–4 carbon atoms. It will be understood that these examples are not exhaustive. Where specific examples of methods for the removal of protecting groups are given below these are similarly not exhaustive. The use of protecting groups and methods of deprotection not specifically mentioned is of course within the scope of the invention.

Examples of hydroxy protecting groups include tetrahydropyranyl, lower alkyl groups (for example t-butyl), lower alkenyl groups (for example allyl); lower alkanoyl groups (for example acetyl); lower alkoxycarbonyl groups (for example t-butoxycarbonyl); lower alkenyloxycarbonyl groups (for example allyloxycarbonyl); phenyl lower alkoxycarbonyl groups (for example benzyloxycarbonyl, p-methoxybenzyloxycarbonyl, o-nitrobenzyloxy-carbonyl, p-nitrobenzyloxycarbonyl); tri lower alkysilyl (for example trimethylsilyl, t-butyldimethylsilyl) and phenyl lower alkyl (for example benzyl) groups.

The hydroxy protecting group may subsequently be removed to give the cross-linked polymer containing free hydroxy groups.

Methods appropriate for removal of hydroxy protecting groups include, for example, acid-, base-, metal- or enzymically-catalysed hydrolysis, for groups such as p-nitrobenzyloxycarbonyl, hydrogenation and for groups aso-nitrobenzyloxycarbonyl, photolytically. The reader is referred to Advanced Organic Chemistry, 4$^{th}$ Edition, by Jerry March, published by John Wiley & Sons 1992, for general guidance on reaction conditions and reagents. The reader is referred to Protective Groups in Organic Synthesis, 2$^{nd}$ Edition, by Green et al., published by John Wiley and Sons for general guidance on protecting groups.

Acetyl is a preferred protecting group for the hydroxy group in protected-hydroxy styrene.

When the cross-linked polymer is produced by polymerisiation of a mixture of monomers comprising styrene and optionally protected hydroxystyrene or chloromethylstyrene, the weight percentage of optionally protected-hydroxystyrene or chloromethylstyrene of the total weight of optionally protected-hydroxystyrene or chloromethylstyrene plus styrene is preferably in the range of from 1–99%, more preferably in the range of from 5–80% and most preferably from 15% to 70%.

The extent of cross linking in the polymers is determined by the concentration of cross linking monomer in the polymerisation reaction. Generally the weight % of cross-linking monomer is in the range of from 0.1 to 70%, commonly from 0.5 to 20%, such as from 1 to 10%, and most preferably no more than 5% by weight. Polymers comprising no more than 20% by weight of cross-linking monomer are generally swellable, whilst polymers comprising greater than 20% of crosslinking monomer are generally not swellable.

Suitable cross-linking monomers include divinyl benzene (DVB) or multifunctional (meth)acrylates such as di/tri acrylates or di/tri methacrylates such as ethylene glycol diacrylate, ethylene glycol dimethacrylate, trimethylopropane trimethacrylate, trivinylbenzene or N,N'-bis-acryloyl ethylene diamine. Preferably the cross-linking monomer is DVB.

Preferably 0.5 to 5% by weight of DVB is used. Most preferably 1 to 3% by weight DVB is used.

The polymer support according to the present invention can be prepared by reacting an appropriately functionalised cross-linked polymer with a poly($C_{2-4}$alkyleneoxy)glycol or derivative thereof. Commonly, the appropriately functionalised cross-linked polymer comprises a free hydroxy group, which is reacted with a poly($C_{2-4}$alkyleneoxy)glycol derivative comprising a leaving group attached to one end of the poly(alkyleneoxy) chain, with the hydroxy group at the other end of the chain being protected by a hydroxy-protecting group. Alternatively, a cross-linked copolymer containing a free hydroxy group can be reacted with a mono-protected poly(alkyleneoxy)glycol.

Cross-linked polymers containing a free hydroxy group are usually produced as beads which range in size from 10 $\mu$m to 2000 $\mu$m. Preferably the bead size is from 50 $\mu$m to 1000 $\mu$m and most preferably from 75 $\mu$m to 500 $\mu$m. The cross-linked polymer beads are generally produced by an aqueous suspension polymerisation process, for example see Journal of Applied Polymer Science, 1982, 27, 133–138, incorporated herein by reference.

In aqueous suspension polymerisation, the monomers are suspended as droplets (1–1000 $\mu$m) in water. Stabilisers are usually added to prevent agglomeration of the droplets, for example polyvinyl alcohol, polyacrylic acid, polyvinyl pyrrolidone, polyalkylene oxide, barium sulphate, magnesium sulphate or sodium sulphate. The suspension is also normally stirred to maintain the suspension.

A free radical initiator is preferably used to initiate polymerisation. The type of initiator will generally be selected based on the monomers used. Examples of preferred free radical initiators include benzoyl peroxide, dioctanoyl peroxide, 2,2'-azobisisobutyronitrile and 2,2'-azobis (2,4-dimethylvaleronitrile).

Polymerisation is typically assisted by heating the mixture in the range of 15° C. to 160° C., preferably 50° C. to 90° C. It will be recognised that the temperature to which the mixture can be heated depends upon the type of monomer and initiator employed.

The resultant polymer may then be washed with suitable solvents such as tetrahydrofuran, methanol and water, dried and bead size classified, for example, by sieving.

Suitable protecting groups for hydroxy are described above. A preferred protecting group for mono-protected poly(alkyleneoxy)glycols and for poly($C_{2-4}$alkyleneoxy) glycol derivatives comprising a leaving group attached to one end of the poly(alkyleneoxy) chain is tetrahydropyranyl.

Polymer supports according to the present invention can be prepared by the reaction between a cross-linked polymer comprising a free hydroxy group and a mono-protected poly(alkyleneoxy)glycol derivative wherein the free hydroxy group has been converted into a leaving group, such as a tosylate, mesylate or halo, such as chloro or bromo, group, in the presence of a strong base, such as sodium methoxide or ethoxide, or sodium hydride, using conditions known for the Williamson ether synthesis.

Cross-linked polymers which do not contain free hydroxy groups but contain groups which can be converted to hydroxy groups can be converted to cross-linked copolymers with free hydroxy groups before reacting with the mono-protected poly(alkyleneoxy)glycol. In some cases this may be carried out in situ.

A cross linked copolymer formed from styrene and chloromethylstyrene may be reacted with the mono-protected poly(alkyleneoxy)glycol in the presence of a strong base, such as sodium methoxide or ethoxide, or sodium hydride, using conditions known for the Williamson ether synthesis.

The polymer supports according to the present invention can also conveniently be prepared by reaction between a cross-linked polymer containing free hydroxy groups and a mono-protected poly(alkyleneoxy)glycol under conditions known for the Mitsunobu reaction. This typically involves reacting the reagents together in the presence of di($C_{1-4}$alkyl)azo-carboxylate or 1',1'-(azodicarbonyl) dipiperidine and a phosphorous reagent such as tributylphosphine or triphenylphosphine in an inert solvent such as toluene, benzene, tetrahydrofuran (THF) or diethylether, at non-extreme temperatures such as in the range −20° C. to ambient temperatures. (See Progress in the Mitsunobu Reaction. A Review, David L. Hughes, Organic Preparations and Procedures Int., 28 (2), 127–164 (1996)).

The polymer supports according to the present invention can alternatively, be prepared by polymerisation of a monomer comprising a hydroxy(poly$C_{2-4}$alkyleneoxy) moiety, preferably in which the free hydroxy of the hydroxy(poly$C_{2-4}$alkyleneoxy) moiety is protected with a suitable hydroxy protecting group, under conditions to produce cross-linking. In many such embodiments, a styrene monomer substituted on the phenyl moiety, preferably at the 4-position, by an optionally protected hydroxy(poly$C_{2-4}$alkyleneoxy) moiety, is polymerised in the presence of a cross-linking monomer. For example, a polymer support which could be prepared by first making the copolymer derived by polymerising styrene, optionally protected 4-hydroxystyrene and appropriate cross-linking monomer and then reacting the cross-linked copolymer with the poly(alkyleneoxy)glycol can alternatively be prepared by polymerising styrene and 4-(optionally protected)-hydroxy(polyalkyleneoxy)styrene together with the appropriate cross-linking monomer. Cross-linking monomers and proportions employed can be as described above for the preparation of cross-linked polymers.

The invention, in its broadest aspect, relates to the particular polymer supports however prepared.

The polymer support according to the present invention has a hydroxy functionality of from 0.1 to about 5, for example up to 4.8 meq (milliequivalents) of hydroxy per gram of polymer, and often from 0.5 to 3.5, commonly 1.0 to 3.3 meq per gram for example from 1.5 to 3 meq per gram of polymer. In many embodiments, polymer supports having from 0.5 to 2 meq of hydroxy per gram of polymer can advantageously be employed.

In a preferred aspect of the invention, the polymer support comprises hydroxypolyethyleneoxy chains attached to a cross-linked copolymer via an ether linkage, wherein the cross-linked polymer can be formed by polymerising styrene and optionally-protected 4-hydroxystyrene, and wherein the hydroxypolyethyleneoxy chain contains from 2 to 8 ethyleneoxy groups and wherein resulting polymer support has about 0.1 to about 5 meq free hydroxy groups per gram of polymer.

In a most preferred aspect of the invention, the polymer support comprises hydroxytetraethyleneoxy chains attached to a cross-linked copolymer via an ether linkage, wherein the cross-linked polymer can be formed by polymerising styrene and 4-acetoxystyrene and subsequently removing the acetyl group, and wherein the resulting polymer support has about 0.1 to about 5 meq free hydroxy groups per gram of polymer.

Another aspect of the invention relates to a polymer support which comprises hydroxypoly$C_{2-4}$ alkyleneoxy chains, wherein the terminal hydroxy group is protected, attached to a cross-linked polymer wherein the hydroxypoly$C_{2-4}$ alkyleneoxy chain contains from 2 to 8 $C_{2-4}$ alkyleneoxy groups.

Preferred protecting groups for the terminal hydroxy group in the hydroxypoly$C_{2-4}$ alkyleneoxy chain are acetyl, benzyl, benzoyl, tri(alkyl)silyl and tetrahydropyranyl groups.

The hydroxy-protecting group can be removed using standard techniques known in the art. For example the tetrahydropyranyl group may be removed with p-toluene sulphonic acid.

Removal of the hydroxy-protecting group gives an unprotected polymer support of the present invention comprising hydroxypoly$C_{2-4}$alkyleneoxy chains on a cross-linked polymer wherein the hydroxypoly$C_{2-4}$alkyleneoxy chains contain from 2 to 8 oxy$C_{2-4}$alkylene groups.

The polymer supports according to the present invention are of use in SPOS, and such use, wherein a process of solid phase organic synthesis occurs on a support according to the present invention, forms another aspect of the present invention. They preferably have a swell ratio of at least 4 in chloroform. They are preferably used in the form of spherical beads.

Traditional organic chemistry has usually been carried out in solution. Methods were developed for the synthesis of oligomers, such as peptides and nucleotides, on a solid phase (typically beads) (Merrifield: Adv Enzymol, 32, 221 (1969)), and this was then very amenable to automation. Ligands were attached to the solid phase by a cleavable linker, the oligomer synthesis was carried out, and the product then cleaved from the solid phase into solution. This method has the advantage that reactions may be forced to completion by the use of large excesses of reagents which may then be removed simply by washing. At the same time any soluble by-products are also removed. Many solid phases have been used, but the most important are derivatives of poly acrylic acid or polystyrene. These polymers are cross linked by inclusion of a divalent monomer to the extent necessary to give the required mechanical strength and solvent compatibility.

The development of combinatorial chemistry techniques (Gallup et al: J Med Chem, 37, 1233–1251 (1994)) wherein many thousands of compounds are synthesised in a single reaction by means of a resin mixing and splitting technique (Furka et al: Int J Pept Prot Res, 37, 487–493 (1991)) to give one (different) pure compound on each bead has lead to the expansion of solid phase chemistry from peptides and nucleotides to all types of organic chemistry, and this has required the development of new polymer supports with properties more suited to the different chemistries (Terrett et al: Tetrahedron 51, 8135–8173 (1995), Balkenhohl et al: Angew Chem Int Ed, 35, 2288–2337 (1996), Thompson and Ellman: Chem Rev, 96, 555–600 (1996)).

Resins such as chloromethyl or aminomethyl polystyrene have been modified to give linking groups with very special properties, making them suitable for SPOS. For example (4-hydroxymethylphenoxy)methyl polystyrene (the so-called 'Wang' resin—Wang: J Amer Chem Soc, 95, 1328–1333)) may be esterified to give esters which are stable to many chemical transformations, but which may be treated with, for example, trifluoroacetic acid to liberate the free acid.

The polymer support of the present invention can be similarly functionalised by converting the terminal hydroxy group into a cleavable linker. Cleavable linkers into which the hydroxy group may be converted are those known in the art for use in SPOS, especially those that can be esterified to give esters which is stable to many chemical transformations, but which may be treated, for example with either an acid, for example, trifluoroacetic acid, or a base or other nucleophile, depending upon the linker, to liberate a free acid or derivative thereof. For example the hydroxy group can be converted, usually via a better leaving group such as chloro, mesylate or tosylate, to a 4-hydroxymethylphenoxy or a 4-(4-methoxyphenyl (hydroxy)methyl)phenoxy group. The polymer supports can also be functionalised by conversion of the hydroxy group to an amino group, commonly via an intermediate leaving group such as chloro, mesylate or tosylate. The amino group can then be employed to attach a cleavable linker, for example via the formation of an amide moiety, thereby attaching the cleavable linker to the poly$C_{2-4}$ alkyleneoxy chain. Cleavable linkers which can be attached to amino groups are well known in the art. Commonly, such linkers are derived from compounds comprising a free carboxylic acid moiety which reacts with the amino group to form an amide. Cleavable linkers which can be attached to amino groups include those derived from 4-hydroxymethylbenzoic acid and 4-hydroxymethylphenoxyacetic acid. For other examples of linkage agents which can be used to functionalise the terminal hydroxy group see Nova Biochem Combinatorial Chemistry Catalogue February 1997, pages 1–29, resins for SPOC.

Hence another aspect of the invention relates to a polymer support which comprises a cleavable linker or an amino group bonded to a cross-linked polymer through a poly$C_{2-4}$ alkyleneoxy chain containing from 2 to 8 $C_{2-4}$ alkyleneoxy groups Accordingly, it will be recognised that the polymer supports according to the present invention can be represented by the general chemical formula:

[Polymer]-(OC$_{2-4}$alkylene)$_{2-8}$—X wherein:
[Polymer] represents a cross-linked polymer; and
X represents OH; OP where P represents a protecting group; a cleavable linker; a leaving group; NH$_2$; or NHY where Y represents a cleavable linker.

As indicated above, many of the polymer supports of the present invention, especially those derived from polymers with a lower degree of cross linking, swell in water or alcohols and at the same time do not have unduly slow relaxation times enabling NMR to be used. In addition, many of the polymer supports swell in methanol and ether, unlike polystyrene supports.

EXAMPLES

Reaction Scheme

A protected polymer support, unprotected support ("PSTEG") and derivatised support according to the present invention were prepared following the reaction scheme:

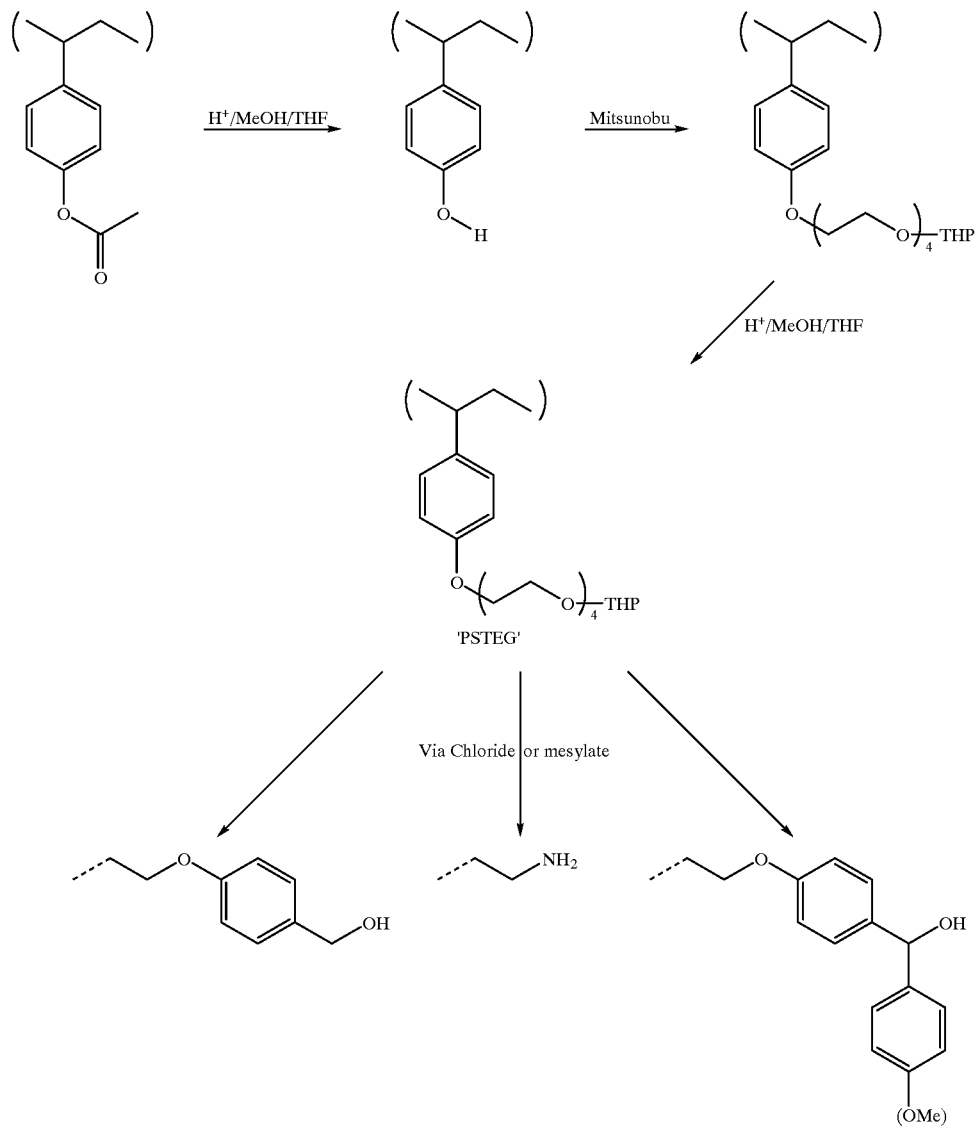

The invention will now be described, without limitation, by the following examples in which, unless otherwise stated:
a) FT-IR spectra were obtained using swollen gels in dichloromethane held between sodium chloride plates, and an ATI Genesis (Matteson)spectrometer.
b) $^3C$ magic angle (MAS) NMR spectra were obtained using solvent swollen gels in the rotor of a Bruker MAS probe on a 400 MHz NMR spectrometer.
c) yields are given for illustration and are not necessarily the maximum attainable.
d) the following abreviations have been used: THF=tetrahydrofuran, DMF=N,N-dimethylformamide, FMOC=fluorenylmethoxycarbonyl, PEG=polyethyleneglycol and THP=tetrahydropyranyl.

wherein a dotted bond indicates connection to PSTEG via an ether linkage derived from the terminal hydroxy of PSTEG.

Synthetic Methods

4-Acetoxy Styrene/Styrene/Divinylbenzene Resin Beads

Distilled water (5.5 liters), sodium sulphate (5.35 g) and 2.5% Airvol™ 540 (polyvinyl alcohol, Airvol™ is a trade name belonging to Air Products Ltd) (200 g) were heated to 80° C. in a cylindrical 10 liter glass reactor and stirred with a stainless steel paddle shaped stirrer blade at 160 rpm. 4-Acetoxystyrene (934.2 g) was added to a mixture of styrene (487.2 g), technical grade divinyl benzene (23.1 g), and benzoyl peroxide (40.3 g). This monomer mixture was poured into the reactor vessel and the whole mixture stirred at 160 rpm at 80° C. for 6 hours. The mixture was then poured into a 50 μm mesh 'top hat' filter and washed with tap water for 30 minutes. The wet beads were transferred to a beaker and allowed to stand for 16 hours in a 1:1 mixture of THF and distilled water (10 liters) before filtering through a sintered filter (porosity 2). The beads were washed three times with THF (6 liters), once with THF/methanol (2:1, 2.5 liters), once with THF/methanol (1:2, 2.5 liters, and three times with methanol (1.5 liters) before drying in a vacuum oven to constant weight.

The beads were classified by sieving, as shown:

| Sieve mesh size | >500 μm | 36.2 g | 2.95% |
|---|---|---|---|
| | 300–500 μm | 175.6 g | 14.35% |
| | 150–300 μm | 990 g | 80.9% |
| | <150 μm | 22.0 g | 1.8% |

The fraction in the range 150–300 μm was used subsequently. It had a swell ratio of 8.5 ml/g in THF. The FT-IR spectrum showed a strong band at 1746 cm$^{-1}$ for the carbonyl group, and the MAS-NMR $^{13}$C spectrum (CDCl$_3$) showed peaks at 21.2 ppm (CH$_3$CO), 169.3 ppm (CO), 121.0, 128.1, 145.0, 148.6 ppm (aromatic).

Hydroxy Polystyrene Resin Beads

The above acetoxystyrene beads (100.1 g) were suspended in THF/methanol (1:1, 1000 ml) containing 300 mg p-toluenesulphonic acid, and the mixture was stirred for 48 hours at 50° C. under an atmosphere of argon. After cooling, the mixture was filtered and the product washed thoroughly five times with 500 ml THF and then three times with 500 ml methanol before drying in a vacuum dessicator. The yield was 81.9 g.

Analysis by FT-IR showed loss of the carbonyl peak at 1746 cm$^{-1}$ and appearance of a broad hydroxyl peak at 3306 cm$^{-1}$. NMR analysis showed loss of the acetyl group (21.2 and 121.0 ppm).

Tetraethyleneglycol Monotetrahydropyranyl (THP) Ether

Tetraethyleneglycol (194 g) and 2,3-dihydropyran (84 g) were mixed and treated very slowly and cautiously with concentrated hydrochloric acid (0.25 ml)—EXOTHERM—temperature kept below 50° C. The mixture was allowed to stand overnight and then neutralised with 10M aqueous sodium hydroxide solution (0.5 ml). It was then distilled under reduced pressure and the fraction boiling between 148 and 151° C. (0.5 mmHg) was redistilled to give 54.3 g product containing 98.6% mono THP ether (by glc), Bpt 160.0° C. at 0.4 mm. This product corresponded to that described in Augusta et al, J Appl Polymer Science 53, 1149–63 (1994).

4-Hydroxy Polystyrene-tetrahydropyranyloxyethoxy Ethoxy Ethoxy Ethyl Ether

4-Hydroxy polystyrene (50 g), triphenylphosphine (150.8 g), and tetraethyleneglycol mono THP ether (120 g) suspended in THF (1000 ml) were stirred under an argon atmosphere and diisopropyl azodicarboxylate (135 ml) in THF (350 ml) was added over 6 hours at a temperature of less than 25° C. (water cooling). The mixture was then stirred for 40 hours and the resin filtered and washed thoroughly twice with THF (500 ml), five times with aqueous THF (1:1, 500 ml), five times with THF (500 ml), and five times with methanol (500 ml) before drying under vacuum.

The product was then resuspended in THF (1000 ml) and the reaction repeated exactly as above.

To cap any remaining hydroxy groups the resin was then suspended in DMF (1200 ml) and sodium methoxide (8.1 g) and iodomethane (28.0 ml) were added under an atmosphere of argon. The mixture was stirred for 24 hours at room temperature and the product then filtered off, and washed four times with DMF (500 ml), four times with aqueous THF (1:1, 500 ml), four times with THF (500 ml), and then four times with methanol (500 ml) before drying under vacuum to give 88.82 g of the title product.

The product was analysed by FT-IR (no OH absorption remaining) and by NMR (CDCl$_3$), showing characteristic peaks at 19.9, 25.2, 31.0, 62.4, and 99.2 ppm (THP ether), 67.5–70.3 ppm (PEG chain), and 114.5, 115.3, 126.0, 128.4, 133.2, 137.9, 145.9, 155.3, and 157.2 ppm (aromatics). The methyl ether from the capping is seen at 55.4 ppm.

4-Hydroxy Polystyrene-mono Ether with Tetraethylene Glycol (PSTEG)

The THP ether above (87.2 g) was suspended in THF/methanol (3:1, 1000 ml), p-toluene sulphonic acid (300 mg) was added, and the mixture was stirred 24 hours at room temperature. The product was collected, washed once with THF (500 ml), four times with aqueous THF (1:1, 500 ml), four times with THF (500 ml), and four times with methanol (500 ml), before drying under vacuum to give 73.4 g product. FT-IR now showed a strong OH absorption at 3468 cm$^{-1}$, and NMR (D$_8$-THF) showed complete loss of the THP ether and the presence of CH$_2$OH at 62.2 ppm.

The following swell ratios were determined for a 4-hydroxy polystyrene-mono ether with tetraethylene glycol resin (PSTEG) in the following solvents.

| Solvent | Swell ratio of PSTEG (ml per g) |
|---|---|
| THF | 8.4 |
| toluene | 4.0 |
| methanol | 5.6 |
| water | 4.0 |
| dichloromethane | 10.0 (floats) |
| DMF | 10.4 |

PSTEG-Methanesulphonate

PSTEG (840 mg) was suspended in dry pyridine (15 ml) under an atmosphere of argon, and methane sulphonyl chloride (0.58 ml) was added dropwise over 5 minutes at 0° C. with shaking. The mixture was then shaken for 7 hours at room temperature, filtered, and the product washed with THF (20 ml), three times with aqueous THF (1:1, 20 ml), three times with THF (20 ml), and three times with ether before drying to give 964 mg of the title product.

FT-IR showed loss of the hydroxy absorption at 3468 cm$^{-1}$, and $^{13}$C NMR showed the methane sulphonyl methyl carbon signal at 37.5 ppm. Elemental analysis gave 5.9% sulphur, corresponding to 1.84 mmol/g of resin, and hence indicating a loading of 2.15 mmol/g for PSTEG.

PSTEG-p-formylphenyl Ether

PSTEG methane sulphonate resin (857 mg), potassium iodide (830 mg), and potassium carbonate (2.07 g) were stirred in DMF (25 ml) under an atmosphere of argon, and 4-hydroxybenzaldehyde (1.83 g) was added and the mixture stirred at 60° C. for 24 hours. After cooling, the product was filtered off and washed twice with water (20 ml), twice with aqueous DMF (1:1, 20 ml), twice with aqueous THF (20 ml), twice with DMF (20 ml), three times with THF (20 ml), and three times with methanol before drying under vacuum to give 866 mg of the title product.

FT-IR showed a carbonyl peak at 1694 cm$^{-1}$, and $^{13}$C NMR showed a peak at 190.6 ppm.

PSTEG-p-(hydroxymethyl)phenyl Ether (PSTEG-Wang Resin).

PSTEG-p-formylphenyl ether (570 mg) was shaken in THF (20 ml), and lithium borohydride (88 mg). The mixture was shaken at 60° C. for 22 hours, cooled, and filtered. The product was washed once with THF (20 ml), once with methanol (20 ml), three times with aqueous THF (1:1), three times with THF (20 ml), and three times with methanol (20 ml) before drying to give 575 mg of the title resin. FT-IR showed loss of the carbonyl group, and presence of peaks at 3459 and 3597 cm$^{-1}$ for the hydroxyl group. $^{13}$C NMR showed peaks at 64.5 ppm for the benzyl alcohol carbon, 68.3 ppm for the terminal carbon of the polyether chain, and 135.7 and 159.0 ppm for the ipso carbons of the oxybenzyl alcohol ring.

PSTEG-Wang Resin Coupled to FMOC Isoleucine

PSTEG-Wang resin (368 mg) was shaken in dichloromethane (20 ml), and FMOC isoleucine (1.412 g) was added. After 10 minutes pyridine (0.33 ml) and 2,6-dichlorobenzoyl chloride (0.57 ml) were added and the mixture shaken for 24 hours. The mixture was filtered and the product washed once with dichloromethane (20 ml), three times with aqueous THF (1:1, 20 ml), three times with THF (20 ml), and three times with methanol (20 ml), before drying to give 482 mg of the title resin.

FT-IR showed the appearance of a carbonyl group at 1722 cm$^{-1}$.

The $^{13}$C NMRs and $^{1}$H NMRs for PSTEG-Wang Resin Coupled to FMOC Isoleucine and for commercial (Novabiochem Ltd) FMOC isoleucyl Wang resin were compared. The spectra obtained for PSTEG-Wang Resin Coupled to FMOC Isoleucine were superior to those obtained from commercial (Novabiochem Ltd) FMOC isoleucyl Wang resin in terms of the clarity of the spectra, especially the resolution of fine detail.

What is claimed is:

1. A polymer support which comprises hydroxypolyC$_{2-4}$ alkyleneoxy chains attached to a cross-linked polymer via a phenoxy ether linkage wherein the hydroxypolyC$_{2-4}$ alkyleneoxy chain contains from 2–8 C$_{2-4}$ alkeneoxy groups and wherein the resulting polymer support has from about 0.1 to about 5 meq free hydroxy groups per gram of polymer.

2. A polymer support according to claim 1, wherein the polymer support has from 0.5 to 3.5 meq of free hydroxy groups per gram of polymer.

3. A polymer support which comprises hydroxypolyC$_{2-4}$ alkyleneoxy chains, wherein the terminal hydroxy group is protected, attached to a cross-linked polymer wherein the protected hydroxypolyC$_{2-4}$ alkyleneoxy chain contains from 2 to 8 C$_{2-4}$ alkyleneoxy groups.

4. A polymer support according to claim 3, wherein the hydroxypolyC$_{2-4}$ alkyleneoxy chain is attached via a phenoxy ether linker.

5. A polymer support according to claim 4, wherein the terminal hydroxy group is protected by a protecting group selected from the group consisting of acetyl, benzyl, tri(alkyl)silyl and tetrahydropyranol groups.

6. A polymer support which comprises a cleavable linker, a leaving group or an amino group bonded to a cross-linked polymer through a polyC$_{2-4}$ alkyleneoxy chain containing from 2 to 8 C$_{2-4}$ alkyleneoxy groups.

7. A polymer support according to claim 6, wherein the cleavable linker comprises a 4-hydroxymethylphenoxy or a 4-(4-methoxyphenyl(hydroxy)methyl)phenoxy group.

8. A polymer support according to claim 6, wherein the cleavable linker is attached to the polyC$_{2-4}$ alkyleneoxy chain via an amide linkage.

9. A polymer support according to any preceding claim 4, wherein the cross linked polymer is a copolymer comprising phenylethylene and 4-hydroxyphenylethylene units.

10. A polymer support according to any of claims 1–9, wherein the number of C$_{2-4}$ alkyleneoxy groups in the hydroxypolyC$_{2-4}$ alkyleneoxy chain is from 3 to 5.

11. A polymer support according to claim 10, wherein the hydroxypolyC$_{2-4}$ alkyleneoxy chain is a hydroxytetraethyleneoxy chain.

12. A process for the preparation of a polymer support which comprises:

a) reaction between a cross-linked polymer comprising a free hydroxy group and a mono-protected poly(alkeneoxy)glycol derivative wherein the free hydroxy group has been converted into a leaving group, the reaction occurring in the presence of a strong base;

b) reaction between a cross-linked polymer containing free hydroxy groups and a mono-protected poly(alkeneoxy)glycol under conditions known for the Mitsunobu reaction; or c) polymerisation of a monomer comprising a hydroxy (polyC$_{2-4}$alkyleneoxy) moiety, in which the free hydroxy of the hydroxy(polyC$_{2-4}$alkyleneoxy) moiety is protected with a protecting group, under conditions to produce cross-linking.

13. A polymer support obtained by a process according to claim 12.

14. A polymer support according to any of claims 1 to 9 wherein the number of C$_{2-4}$ alkyleneoxy groups in the hydroxypolyC$_{2-4}$ alkyleneoxy chain is from 3 to 5 and the cross linked polymer is a copolymer comprising phenylethylene and 4-hydroxyphenylethylene units.

15. A polymer support according to claim 11, wherein the cross linked polymer is a copolymer comprising phenylethylene and 4-hydroxyphenylethylene units.

16. A process of solid phase organic synthesis of a substrate in which the substrate is synthesised whilst bound to a solid support, which is derived from a polymer support which comprises hydroxypolyC$_{2-4}$ alkyleneoxy chains attached to a cross-linked polymer via a phenoxy ether linkage wherein the hydroxypolyC$_{2-4}$ alkyleneoxy chain contains from 2 to 8 C$_{2-4}$ alkyleneoxy groups and wherein the resulting polymer support has from about 0.1 to about 5 meq free hydroxy groups per gram of polymer.

* * * * *